United States Patent
Chang et al.

(10) Patent No.: US 12,424,695 B2
(45) Date of Patent: Sep. 23, 2025

(54) RETENTION ASSEMBLIES FOR TRACTION BATTERY PACKS WITH CELL-TO-PACK BATTERY SYSTEMS

(71) Applicant: FORD GLOBAL TECHNOLOGIES, LLC, Dearborn, MI (US)

(72) Inventors: Jim Chang, Ann Arbor, MI (US); Patrick Daniel Maguire, Ann Arbor, MI (US); Mohammadreza Eftekhari, Novi, MI (US); Jason C. Marcath, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 642 days.

(21) Appl. No.: 17/851,571

(22) Filed: Jun. 28, 2022

(65) Prior Publication Data

US 2023/0307768 A1   Sep. 28, 2023

Related U.S. Application Data

(60) Provisional application No. 63/322,766, filed on Mar. 23, 2022.

(51) Int. Cl.
*H01M 50/264* (2021.01)
*H01M 50/249* (2021.01)

(52) U.S. Cl.
CPC ....... *H01M 50/264* (2021.01); *H01M 50/249* (2021.01)

(58) Field of Classification Search
None
See application file for complete search history.

(56) References Cited

U.S. PATENT DOCUMENTS

| | | |
|---|---|---|
| 8,089,248 B2 | 1/2012 | Tabatowski-Bush |
| 8,968,912 B2 | 3/2015 | Maguire et al. |
| 9,217,781 B2 | 12/2015 | Tabatowski-Bush et al. |
| 9,412,980 B2 | 8/2016 | Garascia et al. |
| 9,425,628 B2 | 8/2016 | Pham et al. |
| 9,446,680 B2 | 9/2016 | Chen et al. |
| 9,515,357 B2 | 12/2016 | Haskins et al. |
| 9,799,932 B2 | 10/2017 | Haskins et al. |
| 9,912,003 B2 | 3/2018 | Morimoto et al. |
| 10,109,897 B2 | 10/2018 | Haskins et al. |
| 10,270,078 B2 | 4/2019 | Oechsle et al. |
| 10,566,647 B2 | 2/2020 | Andryukov et al. |
| 10,601,006 B2 | 3/2020 | Maguire et al. |

(Continued)

FOREIGN PATENT DOCUMENTS

| | | |
|---|---|---|
| CN | 101860053 A | 10/2010 |
| CN | 101860053 B | 4/2015 |

(Continued)

*Primary Examiner* — Wyatt P McConnell
(74) *Attorney, Agent, or Firm* — David B. Kelley; Carlson, Gaskey & Olds, P.C.

(57) ABSTRACT

Retention assemblies are disclosed for retaining a battery cell stack/matrix relative to an enclosure tray on traction battery packs that include cell-to-pack battery systems. The retention assemblies may be positioned between a cell stack/cell matrix and an interior surface of the enclosure tray. The retention assemblies may include features such as slider panels, clips, adhesive, and/or shims designed for holding the cell stacks down at the cell stack-to-enclosure tray interface.

17 Claims, 7 Drawing Sheets

(56) References Cited

U.S. PATENT DOCUMENTS

| | | |
|---|---|---|
| 10,608,222 B2 | 3/2020 | Montgomery et al. |
| 10,759,281 B2 | 9/2020 | Miller et al. |
| 10,784,495 B2 | 9/2020 | Fernandez-Galindo et al. |
| 10,833,303 B2 | 11/2020 | Cao et al. |
| 11,005,131 B2 | 5/2021 | Zhou et al. |
| 11,024,913 B2 | 6/2021 | Subramanian et al. |
| 11,050,125 B1 | 6/2021 | Zhu et al. |
| 11,114,726 B2 | 9/2021 | Gu et al. |
| 11,128,009 B2 | 9/2021 | Chen et al. |
| 11,139,537 B2 | 10/2021 | Wu et al. |
| 11,217,847 B2 | 1/2022 | Eftekhari et al. |
| 11,258,119 B2 | 2/2022 | Wang et al. |
| 11,264,669 B2 | 3/2022 | Jiang |
| 11,283,130 B2 | 3/2022 | Chen et al. |
| 11,289,750 B2 | 3/2022 | Zhou et al. |
| 11,302,972 B2 | 4/2022 | Chu et al. |
| 11,302,973 B2 | 4/2022 | Maguire et al. |
| 11,302,990 B2 | 4/2022 | Huang et al. |
| 11,329,347 B2 | 5/2022 | Huang et al. |
| 11,335,960 B2 | 5/2022 | Wang et al. |
| 11,362,392 B2 | 6/2022 | Wang et al. |
| 11,362,393 B2 | 6/2022 | Wang et al. |
| 11,387,519 B2 | 7/2022 | Huang et al. |
| 11,404,744 B1 | 8/2022 | Yang et al. |
| 11,417,932 B2 | 8/2022 | Tang et al. |
| 11,417,936 B2 | 8/2022 | Wang et al. |
| 2010/0259221 A1 | 10/2010 | Tabatowski-Bush |
| 2013/0164592 A1 | 6/2013 | Maguire et al. |
| 2017/0104251 A1 | 4/2017 | Wang |
| 2019/0305389 A1 | 10/2019 | Poirier et al. |
| 2020/0091494 A1 | 3/2020 | Fernandez-Galindo et al. |
| 2020/0203684 A1 | 6/2020 | Chen et al. |
| 2020/0203779 A1 | 6/2020 | Wang et al. |
| 2020/0212387 A1 | 7/2020 | Su et al. |
| 2020/0212397 A1 | 7/2020 | Wang et al. |
| 2020/0212418 A1 | 7/2020 | Chen et al. |
| 2020/0381697 A1 | 12/2020 | Fernandez-Galindo et al. |
| 2021/0066686 A1 | 3/2021 | Siewert et al. |
| 2021/0091348 A1 | 3/2021 | Lateef et al. |
| 2021/0091437 A1 | 3/2021 | Chen et al. |
| 2021/0104798 A1 | 4/2021 | Jiang et al. |
| 2021/0119279 A1 | 4/2021 | Wang et al. |
| 2021/0218117 A1 | 7/2021 | Zhu et al. |
| 2021/0229541 A1 | 7/2021 | Smith et al. |
| 2021/0305641 A1 | 9/2021 | Bai et al. |
| 2021/0305642 A1 | 9/2021 | Bai et al. |
| 2021/0320349 A1 | 10/2021 | Jiang et al. |
| 2021/0320372 A1 | 10/2021 | Jiang et al. |
| 2021/0402863 A1 | 12/2021 | Huang et al. |
| 2021/0408634 A1 | 12/2021 | Yin et al. |
| 2022/0052414 A1 | 2/2022 | Huang et al. |
| 2022/0052415 A1 | 2/2022 | Huang et al. |
| 2022/0059897 A1 | 2/2022 | Huang et al. |
| 2022/0059902 A1 | 2/2022 | Jiang et al. |
| 2022/0077521 A1 | 3/2022 | Jin et al. |
| 2022/0085450 A1 | 3/2022 | Chu et al. |
| 2022/0102800 A1 | 3/2022 | Wang et al. |
| 2022/0109211 A1 | 4/2022 | Wang et al. |
| 2022/0123394 A1 | 4/2022 | Zhang et al. |
| 2022/0123423 A1 | 4/2022 | Wang et al. |
| 2022/0149458 A1 | 5/2022 | Jiang et al. |
| 2022/0158296 A1 | 5/2022 | Chen et al. |
| 2022/0185088 A1 | 6/2022 | Zhang et al. |
| 2022/0190416 A1 | 6/2022 | Wu |
| 2022/0190423 A1 | 6/2022 | Wu et al. |
| 2022/0216555 A1 | 7/2022 | Huang et al. |
| 2022/0221084 A1 | 7/2022 | Huang et al. |
| 2022/0231370 A1 | 7/2022 | Yang et al. |
| 2022/0231371 A1 | 7/2022 | Jiang et al. |
| 2022/0255172 A1 | 8/2022 | Guo et al. |
| 2023/0163393 A1* | 5/2023 | Andersson .......... H01M 10/486 429/99 |

FOREIGN PATENT DOCUMENTS

| | | |
|---|---|---|
| CN | 107757374 A | 3/2018 |
| CN | 208738329 U | 4/2019 |
| CN | 209016158 U | 6/2019 |
| CN | 209045657 U | 6/2019 |
| CN | 110048042 A | 7/2019 |
| CN | 209071465 U | 7/2019 |
| CN | 209104196 U | 7/2019 |
| CN | 209104221 U | 7/2019 |
| CN | 209104222 U | 7/2019 |
| CN | 209104228 U | 7/2019 |
| CN | 209104230 U | 7/2019 |
| CN | 209104232 U | 7/2019 |
| CN | 209104234 U | 7/2019 |
| CN | 209104235 U | 7/2019 |
| CN | 209104236 U | 7/2019 |
| CN | 209104237 U | 7/2019 |
| CN | 209104238 U | 7/2019 |
| CN | 209104242 U | 7/2019 |
| CN | 209104331 U | 7/2019 |
| CN | 209183581 U | 7/2019 |
| CN | 209183604 U | 7/2019 |
| CN | 209183605 U | 7/2019 |
| CN | 209183611 U | 7/2019 |
| CN | 209183612 U | 7/2019 |
| CN | 209183614 U | 7/2019 |
| CN | 209249637 U | 8/2019 |
| CN | 209357799 U | 9/2019 |
| CN | 209401679 U | 9/2019 |
| CN | 209401680 U | 9/2019 |
| CN | 209401682 U | 9/2019 |
| CN | 209401684 U | 9/2019 |
| CN | 209447908 U | 9/2019 |
| CN | 110350256 A | 10/2019 |
| CN | 209592271 U | 11/2019 |
| CN | 209607884 U | 11/2019 |
| CN | 209641720 U | 11/2019 |
| CN | 209710493 U | 11/2019 |
| CN | 209730104 U | 12/2019 |
| CN | 209747621 U | 12/2019 |
| CN | 209787546 U | 12/2019 |
| CN | 209843820 U | 12/2019 |
| CN | 209936788 U | 1/2020 |
| CN | 110931700 A | 3/2020 |
| CN | 210136922 U | 3/2020 |
| CN | 210136943 U | 3/2020 |
| CN | 210182435 U | 3/2020 |
| CN | 210566905 U | 5/2020 |
| CN | 111354885 A | 6/2020 |
| CN | 210744037 U | 6/2020 |
| CN | 111384314 B | 1/2021 |
| CN | 111384325 B | 2/2021 |
| CN | 112310525 A | 2/2021 |
| CN | 112331982 A | 2/2021 |
| CN | 109742281 B | 5/2021 |
| CN | 111354987 B | 5/2021 |
| CN | 111384337 B | 5/2021 |
| CN | 112331997 B | 11/2021 |
| CN | 113871789 A | 12/2021 |
| CN | 112310541 B | 3/2022 |
| CN | 216054919 U | 3/2022 |
| CN | 216120549 U | 3/2022 |
| CN | 216120659 U | 3/2022 |
| CN | 216213898 U | 4/2022 |
| CN | 216354437 U | 4/2022 |
| CN | 216354439 U | 4/2022 |
| CN | 111430826 B | 6/2022 |
| CN | 216720168 U | 6/2022 |
| CN | 216720172 U | 6/2022 |
| CN | 216750072 U | 6/2022 |
| CN | 216750142 U | 6/2022 |
| CN | 216872085 U | 7/2022 |
| CN | 216903107 U | 7/2022 |
| CN | 216903128 U | 7/2022 |
| CN | 216903497 U | 7/2022 |
| DE | 102016119118 A1 | 4/2017 |
| DE | 102017121796 A1 | 3/2018 |
| DE | 102019108631 A1 | 10/2019 |

(56) References Cited

FOREIGN PATENT DOCUMENTS

| | | |
|---|---|---|
| DE | 102019125140 A1 | 3/2020 |
| DE | 102020124986 A1 | 3/2021 |
| DE | 102021101385 A1 | 9/2021 |
| EP | 3671904 A1 | 6/2020 |
| EP | 3671940 A1 | 6/2020 |
| EP | 3672377 A1 | 6/2020 |
| EP | 3675204 A1 | 7/2020 |
| EP | 3675207 A1 | 7/2020 |
| EP | 3675216 B1 | 7/2020 |
| EP | 3675217 A1 | 7/2020 |
| EP | 3675220 A1 | 7/2020 |
| EP | 3675221 A1 | 7/2020 |
| EP | 3675236 A1 | 7/2020 |
| EP | 3675271 A1 | 7/2020 |
| EP | 3798491 A1 | 3/2021 |
| EP | 3799150 A1 | 3/2021 |
| EP | 3799151 A1 | 3/2021 |
| EP | 3905366 A1 | 3/2021 |
| EP | 3806231 A1 | 4/2021 |
| EP | 3852187 A1 | 7/2021 |
| EP | 3920255 A1 | 8/2021 |
| EP | 3883005 A1 | 9/2021 |
| EP | 3883006 A1 | 9/2021 |
| EP | 3883042 A1 | 9/2021 |
| EP | 3886198 A1 | 9/2021 |
| EP | 3886200 A1 | 9/2021 |
| EP | 3886201 A1 | 9/2021 |
| EP | 3671893 B1 | 11/2021 |
| EP | 3699979 B1 | 11/2021 |
| EP | 3920315 A1 | 12/2021 |
| EP | 3930027 A1 | 12/2021 |
| EP | 3944397 A1 | 1/2022 |
| EP | 3944398 A1 | 1/2022 |
| EP | 3955333 A1 | 2/2022 |
| EP | 3799194 B1 | 3/2022 |
| EP | 3985787 A1 | 4/2022 |
| EP | 3799153 B1 | 6/2022 |
| IN | 209104229 U | 7/2019 |
| IN | 209401715 U | 9/2019 |
| IN | 110416448 A | 11/2019 |
| IN | 112331981 B | 9/2021 |
| JP | 2010246372 A | 10/2010 |
| KR | 100488875 B1 | 5/2005 |
| KR | 1020100112530 A | 10/2010 |
| KR | 101695641 B1 | 1/2017 |

\* cited by examiner

RETENTION ASSEMBLIES FOR TRACTION BATTERY PACKS WITH CELL-TO-PACK BATTERY SYSTEMS

CROSS-REFERENCE TO RELATED APPLICATIONS

This disclosure claims priority to U.S. Provisional Application No. 63/322,766, which was filed on Mar. 23, 2022 and is incorporated herein by reference.

TECHNICAL FIELD

This disclosure relates generally to traction battery packs, and more particularly to retention assemblies for retaining a cell stack or a cell matrix relative to an enclosure tray on traction battery packs that include cell-to-pack battery systems.

BACKGROUND

Electrified vehicles include a drivetrain having one or more electric machines. The electric machines can drive the electrified vehicles instead of, or in addition to, an internal combustion engine. A traction battery pack can power the electric machines and other electrical loads of the vehicle.

Conventional traction battery packs include groupings of battery cells called battery arrays. The battery arrays include various array support structures (e.g., array frames, spacers, rails, walls, end plates, bindings, etc.) that are arranged for grouping and supporting the battery cells in multiple individual units inside the traction battery pack enclosure.

SUMMARY

A traction battery pack according to an exemplary aspect of the present disclosure includes, among other things, an enclosure assembly including an enclosure tray, and a cell-to-pack battery system housed within the enclosure assembly. The cell-to-pack battery system includes a cell stack and a retention assembly. The retention assembly includes a slider panel that establishes an interface between the cell stack and a side wall of the enclosure tray.

In a further non-limiting embodiment of the forgoing traction battery pack, the slider panel is secured to a battery cell that is located at a longitudinal extent of the cell stack.

In a further non-limiting embodiment of either of the foregoing traction battery packs, the cell stack establishes a cell row of a cell matrix of the cell-to-pack battery system.

In a further non-limiting embodiment of any of the foregoing traction battery packs, the enclosure tray provides a cell-compressing opening for compressing the cell matrix.

In a further non-limiting embodiment of any of the foregoing traction battery packs, the retention assembly further includes a clip received within a pocket of the slider panel.

In a further non-limiting embodiment of any of the foregoing traction battery packs, the clip includes a first leg that interfaces with the slider panel and a second leg that interfaces with the side wall of the enclosure tray.

In a further non-limiting embodiment of any of the foregoing traction battery packs, the first leg includes a hooked portion that engages a lip provided within the pocket of the slider panel.

In a further non-limiting embodiment of any of the foregoing traction battery packs, the second leg includes a retention flange that engages a lip of the side wall and a tab that engages an interior surface of the side wall.

In a further non-limiting embodiment of any of the foregoing traction battery packs, the retention assembly further includes a clip received within a pocket of the slider panel and a shim received within a slot of the clip.

In a further non-limiting embodiment of any of the foregoing traction battery packs, the retention assembly further includes a structural adhesive received within a pocket of the slider panel.

In a further non-limiting embodiment of any of the foregoing traction battery packs, a side wall of the pocket, a floor of the pocket, and an interior surface of the side wall of the enclosure tray establish a containment perimeter about the structural adhesive.

In a further non-limiting embodiment of any of the foregoing traction battery packs, at least one of the side wall or the floor includes a ribbed surface.

A traction battery pack according to another exemplary aspect of the present disclosure includes, among other things, an enclosure assembly including an enclosure cover and an enclosure tray, and a cell-to-pack battery system housed within the enclosure assembly and including a cell matrix and a retention assembly. The retention assembly includes a slider panel that establishes an interface between the cell matrix and a side wall of the enclosure tray.

In a further non-limiting embodiment of the foregoing traction battery pack, the cell matrix includes a plurality of cell stacks.

In a further non-limiting embodiment of either of the foregoing traction battery packs, the retention assembly further includes a clip received within a pocket of the slider panel.

In a further non-limiting embodiment of any of the foregoing traction battery packs, the clip includes a first leg that interfaces with the slider panel and a second leg that interfaces with the side wall of the enclosure tray.

In a further non-limiting embodiment of any of the foregoing traction battery packs, the first leg includes a hooked portion that engages a lip provided within the pocket of the slider panel. The second leg includes a retention flange that engages a lip of the side wall and a tab that engages an interior surface of the side wall.

In a further non-limiting embodiment of any of the foregoing traction battery packs, the retention assembly further includes a clip received within a pocket of the slider panel and a shim received within a slot of the clip.

In a further non-limiting embodiment of any of the foregoing traction battery packs, the retention assembly further includes a structural adhesive received within a pocket of the slider panel.

In a further non-limiting embodiment of any of the foregoing traction battery packs, the pocket includes a ribbed surface.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details retention assemblies for retaining a battery cell stack/matrix relative to an enclosure tray on traction battery packs that include cell-to-pack battery systems. The retention assemblies may be positioned between a cell stack/cell matrix and an interior surface of the enclosure tray. The retention assemblies may include features such as slider panels, clips, adhesive, and/or shims designed for holding the cell stacks down at the cell stack-to-enclosure tray interface. These and other features are discussed in greater detail in the following paragraphs of this detailed description.

Figure 1:
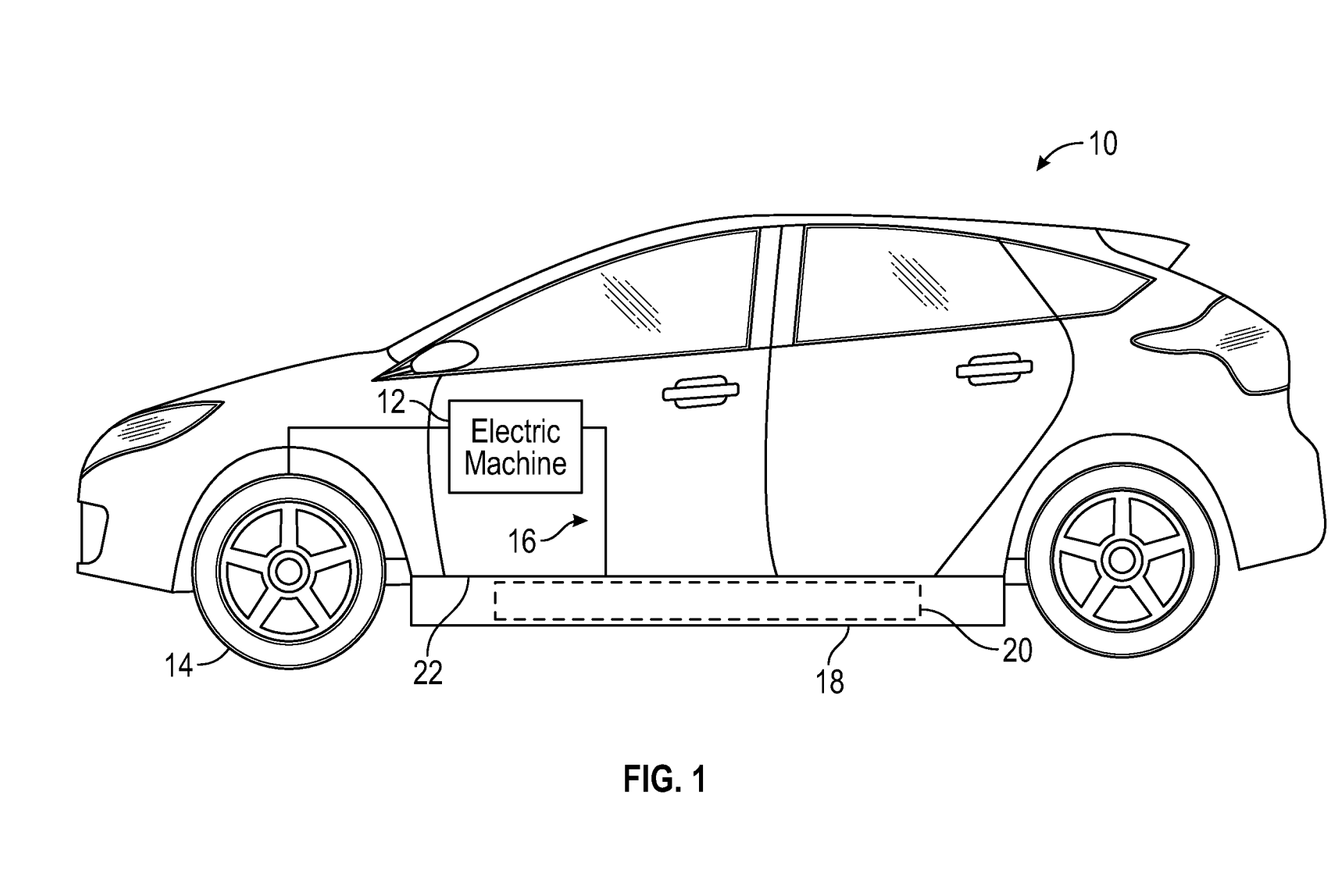
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the electrified vehicle 10 could be equipped with an internal combustion engine that can be employed either alone or in combination with other power sources to propel the electrified vehicle 10.

In an embodiment, the electrified vehicle 10 is a car. However, the electrified vehicle 10 could alternatively be a pickup truck, a van, a sport utility vehicle (SUV), or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more drive wheels 14 of the electrified vehicle 10.

A voltage bus 16 may electrically couple the electric machine 12 to a traction battery pack 18. The traction battery pack 18 is capable of outputting electrical power to power the electric machine 12 and/or other electrical loads of the electrified vehicle 10.

The traction battery pack 18 may be secured to an underbody 22 of the electrified vehicle 10. However, the traction battery pack 18 could be located elsewhere on the electrified vehicle 10 within the scope of this disclosure.

The traction battery pack 18 is an exemplary electrified vehicle battery. The traction battery pack 18 may be a high voltage traction battery pack that includes a cell-to-pack battery system 20. Unlike conventional traction battery pack battery systems, the cell-to-pack battery system 20 incorporates battery cells or other energy storage devices without the cells being arranged in individual arrays or modules. The cell-to-pack battery system 20 therefore eliminates most if not all the array support structures (e.g., array frames, spacers, rails, walls, end plates, bindings, etc.) necessary for grouping the battery cells into the arrays/modules. Further, the cell-to-pack battery system 20 may provide the total high voltage bus electrical potential of the traction battery pack 18 with a single battery unit as opposed to conventional battery systems that require multiple individual battery arrays/modules that must be connected together after being positioned within the battery enclosure for achieving the total high voltage electrical potential.

Figure 2:
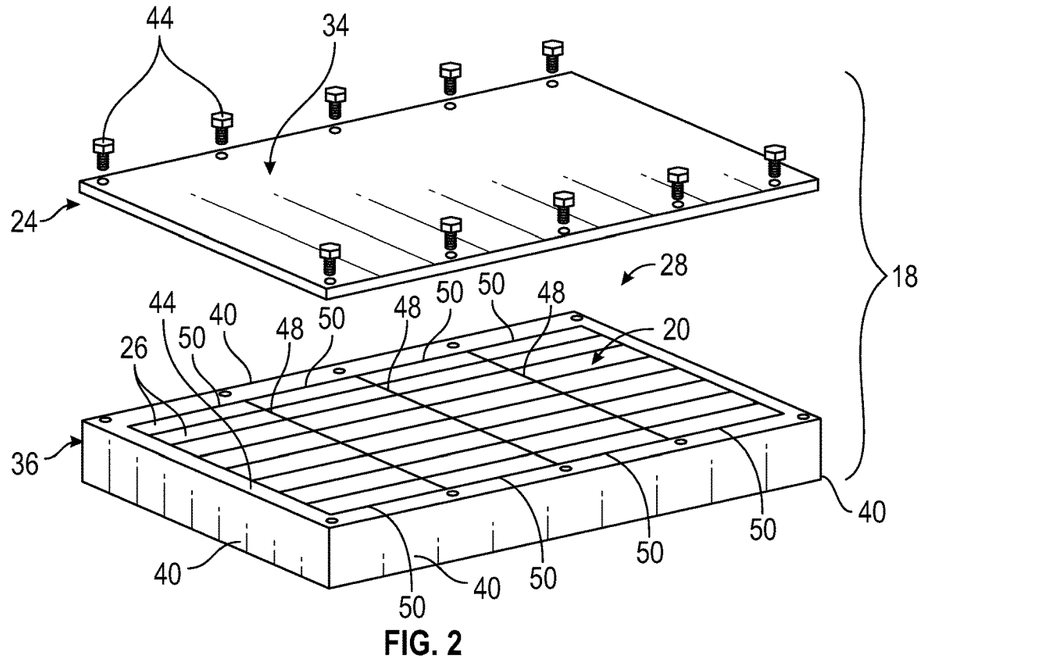
FIG. 2 illustrates a traction battery pack of the electrified vehicle of FIG. 1.
Figure 3:
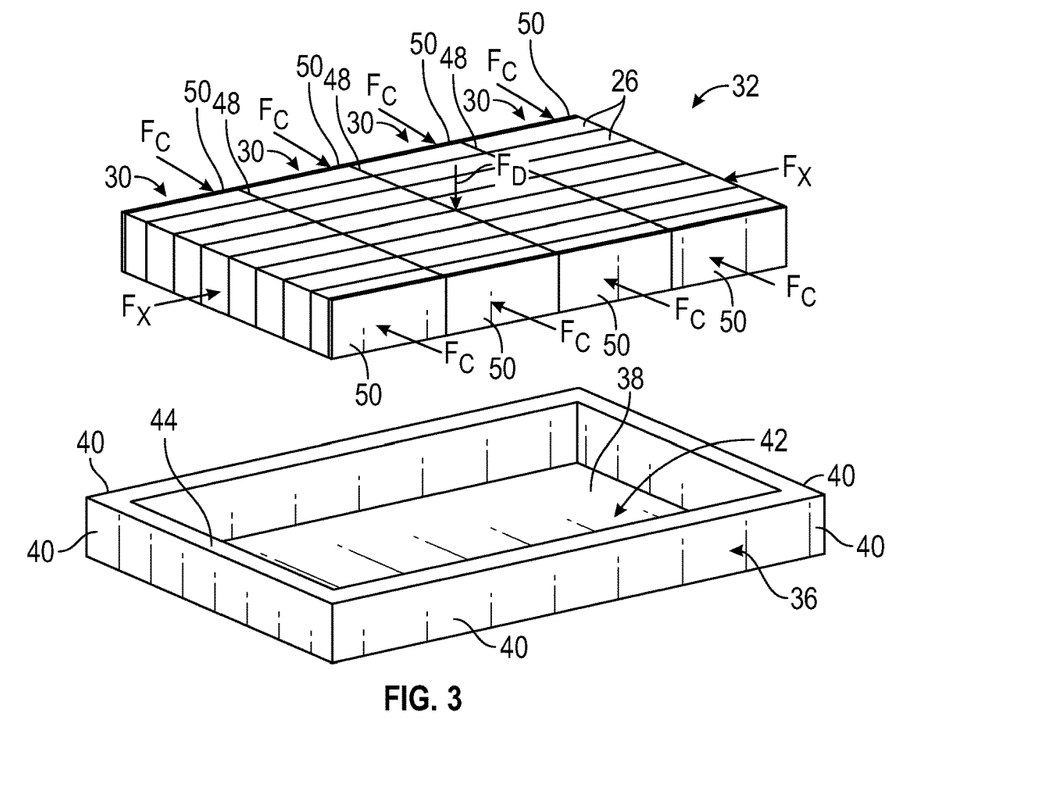
FIG. 3 illustrates a cell-to-pack battery system of the traction battery pack of FIG. 2.

Referring now to FIGS. 2 and 3, the traction battery pack 18 may include an enclosure assembly 24 that is arranged for housing the cell-to-pack battery system 20. In an embodiment, the cell-to-pack battery system 20 includes a plurality of battery cells 26 that are held within an interior area 28 established by the enclosure assembly 24.

The battery cells 26 may supply electrical power to various components of the electrified vehicle 10. The battery cells 26 may be stacked side-by-side relative to one another to construct a cell stack 30, and the cell stacks 30 may be positioned side-by-side in rows to provide a cell matrix 32.

In an embodiment, each cell stack 30 includes eight individual battery cells 26, and the cell matrix 32 includes four cell stacks 30 for a total of thirty-two battery cells 26. Providing an even quantity of battery cells 26 and an even quantity of cell stacks 30 can help to support an efficient electrical bussing arrangement. Although a specific number of battery cells 26 and cells stacks 30 are illustrated in the various figures of this disclosure, the cell-to-pack battery system 20 of the traction battery pack 18 could include any number of battery cells 26 and any number of cell stacks 30. In other words, this disclosure is not limited to the exemplary configuration shown in FIGS. 2 and 3.

In an embodiment, the battery cells 26 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The enclosure assembly 24 of the traction battery pack 18 may include an enclosure cover 34 and an enclosure tray 36. The enclosure cover 34 may be secured to the enclosure tray 36 to provide the interior area 28 for housing the cell-to-pack battery system 20.

The enclosure tray 36 may include a floor 38 and a plurality of side walls 40 arranged relative to one another to provide a cell-compressing opening 42. The floor 38 and the side walls 40 may be mechanically coupled to one another, such as by welding, for example.

During assembly of the traction battery pack 18, the enclosure cover 34 may be secured to the enclosure tray 36 at an interface 44 that substantially circumscribes the interior area 28. In some implementations, mechanical fasteners 46 may be used to secure the enclosure cover 34 to the enclosure tray 36, although other fastening methodologies (adhesion, etc.) could also be suitable.

The cell matrix 32 of the cell-to-pack battery system 20 may be positioned within the cell-compressing opening 42 provided by the enclosure tray 36. The exemplary enclosure tray 36 is depicted as including a single cell-compressing opening 42, however it should be understood that this disclosure extends to structural assemblies that provide one or more cell-compressing openings. The enclosure cover 34 may cover the cell matrix 32 within the cell-compressing opening 42 to substantially surround the battery cells 26 on all sides. Once fully assembled and positioned relative to the enclosure tray 36, the cell matrix 32 may establish a single battery unit capable of providing the total high voltage bus electrical potential of the traction battery pack 18.

The enclosure tray 36 may compress and hold the cell matrix 32 when the cell matrix 32 is received within the cell-compressing opening 42. In an embodiment, the side walls 40 of the enclosure tray 36 apply forces to the cell matrix 32 when the cell matrix 32 is positioned within the cell-compressing opening 42.

In an embodiment, in order to insert the cell matrix 32 into the cell-compressing opening 42, the cell matrix 32 may first be compressed, and then, while compressed, moved into place in the cell-compressing opening 42. A compressive force $F_C$ may be applied to opposed ends of one of the cell stacks 30. The compressive force $F_C$ essentially squeezes the battery cells 26 within the cell stack 30, thereby compressing the cell stack 30 and the individual battery cells 26 to a reduced thickness. While the compressive force $F_C$ is applied to the cell stack 30, the cell stack 30 may be inserted into a respective cell-compressing opening 42 by a downward force $F_D$. The downward force $F_D$ may be applied directly to one or more of the battery cells 26.

While the term "downward" is used herein to describe the downward force $F_D$, it should be understood that the term "downward" is used herein to refer to all forces tending to press a cell stack 30 into a cell-compressing opening 42. In particular, the term "downward" refers to all forces substantially perpendicular to the compressive forces $F_C$, whether or not the force is truly in a "downward" direction. For example, this disclosure extends to cell stacks that are compressed and inserted into a cell-compressing opening in a sideways direction.

The cell stacks 30 could be individually compressed and inserted into the cell-compressing opening 42. In another embodiment, the entire cell matrix 32 is compressed and inserted into the cell-compressing opening 42. As schematically shown in FIG. 3, in such an embodiment, additional compressive forces $F_X$ can compress the cell stacks 30 together for insertion of the cell matrix 32 into the cell-compressing opening 42. The compressive forces $F_X$ are generally perpendicular to the compressive forces $F_C$. The compressive forces $F_X$ may be applied together with the compressive forces $F_C$. The force $F_D$ may then be applied to move the entire cell matrix 32 into the cell-compressing opening 42.

In an embodiment, an entire perimeter of the cell-compressing opening 42 is defined by the side walls 40 of the enclosure tray 36. The side walls 40 can apply a compressive force to the battery cells 26 about the entire perimeter of the cell matrix 32. The side walls 40 may therefore function as a rigid halo-type structure that compresses and tightly holds the cell matrix 32.

The configuration described above is considered to be a cell-to-pack type battery pack, which differs from conventional battery pack types that include enclosures holding arrays of battery cells enclosed by array support structures that are spaced apart from walls of a battery enclosure, and where the battery enclosure does not apply compressive forces to any of the battery cells. The cell-to-pack type battery pack described herein also eliminates the rigid cross members that are commonly secured to the enclosure tray of conventional traction battery backs for providing mounting points for securing the battery arrays and the enclosure cover.

The cell-to-pack battery system 20 may further include one or more cell row separators 48. In an embodiment, one cell row separator 48 is positioned between each adjacent pair of cell stacks 30 of the cell matrix 32. In other embodiments, two cell row separators 48 are provided with each cell stack 30. However, the total number of cell row separators 48 provided within the cell-to-pack battery system 20 is not intended to limit this disclosure.

The cell-to-pack battery system 20 may further include one or more retention assemblies 50 for retaining each cell stack 30/cell matrix 32 relative to the enclosure tray 36. In an embodiment, two retention assemblies 50 are provided for each cell stack 30 of the cell matrix 32, with one retention assembly 50 disposed at each longitudinal extent of the cell stack 30. However, the total number of retention assemblies 50 provided within the cell-to-pack battery system 20 is not intended to limit this disclosure. The battery cells 26 may be stacked between the retention assemblies 50 when the cell matrix 32 is fully assembled.

As further detailed below, the retention assemblies 50 may provide various functions and advantages to the cell-to-pack battery system 20, including but not limited to facilitating insertion of the cell stacks 30/cell matrix 32 into the enclosure tray 36, retaining the cell stacks 30 at the cell stack-to-enclosure tray interface, adding stiffness across the cell matrix 32, etc. The functionality provided by the retention assemblies 50 described herein may be particularly beneficial for traction battery packs that include cell-to-pack type battery systems because the array support structures traditionally provided within battery arrays have been largely eliminated from the cell-to-pack battery system 20, and the rigid cross members traditionally provided for establishing mounting points for securing battery cell groupings have been eliminated from the enclosure tray 36.

Figure 4:
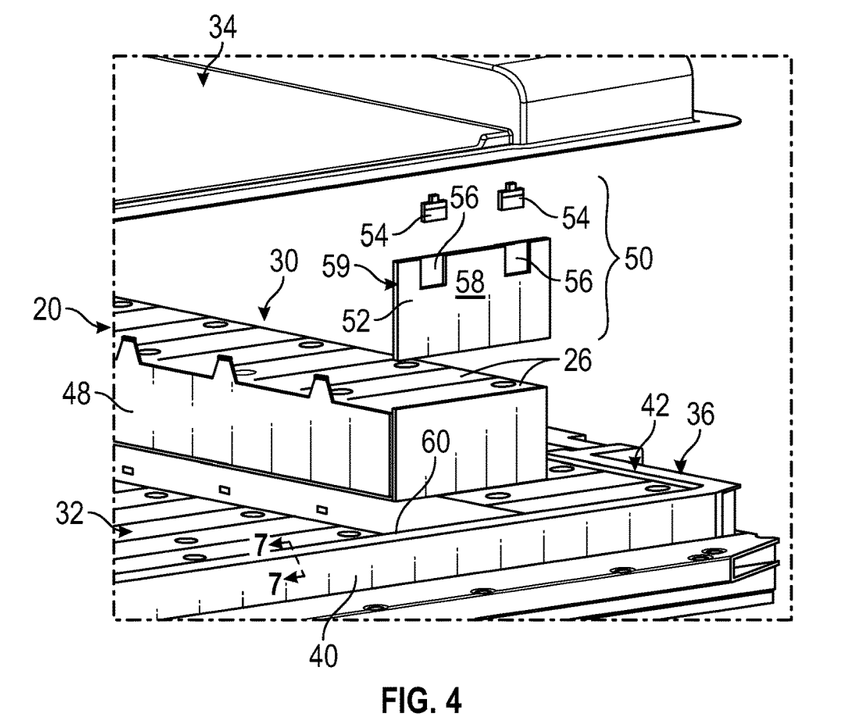
FIG. 4 is a partially exploded view of a traction battery pack having a cell-to-pack battery system.
Figure 5:
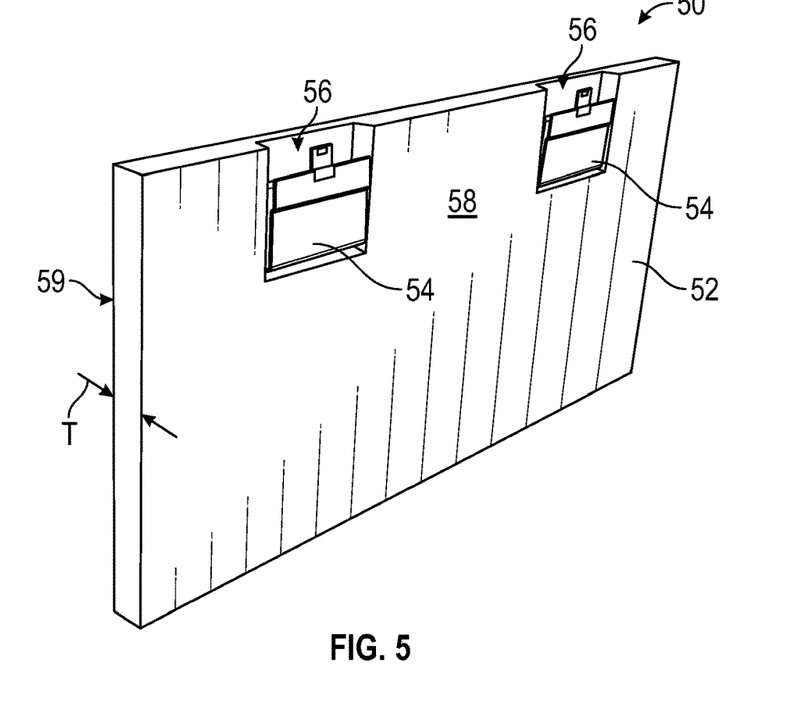
FIG. 5 illustrates a retention assembly of the cell-to-pack battery system of FIG. 4.
Figure 6:
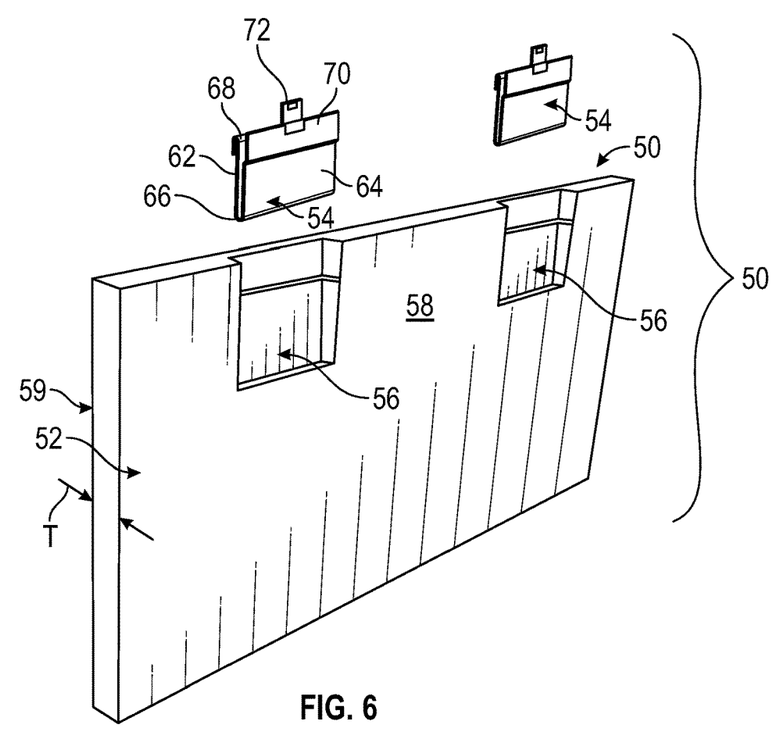
FIG. 6 is an exploded view of the retention assembly of FIG. 5.

FIGS. 4, 5, and 6, with continued reference to FIGS. 1-3, illustrates an exemplary design of a retention assembly 50 for use within the cell-to-pack battery system 20. As mentioned above, the cell-to-pack battery system 20 could include a plurality of retention assemblies 50. In an exemplary embodiment, two retention assemblies 50 may be provided for each cell stack 30 of the cell-to-pack battery system 20.

Each retention assembly 50 may include a slider panel 52 and one or more clips 54. Each clip 54 may be secured within a pocket 56 formed in an outer face 58 of the slider panel 52. When received within the cell-compressing opening 42, the outer face 58 of the slider panel 52 faces toward and interfaces with an interior surface 60 of one of the side walls 40 of the enclosure tray 36. An opposing outer face 59 of the slider panel 52 may interface with one of the battery cells 26 of the cell stack 30. The slider panel 52 may be secured to the cell stack 30, such as with one or more sections of two-sided adhesive tape or any other suitable adhesive (not shown).

The slider panel 52 may include a relatively nominal thickness T. In some embodiments, the thickness T may be between about 2 mm to about 5 mm, although other thicknesses may also be suitable. The thickness T is therefore smaller than that of the battery cells 26, for example. In this disclosure, the term "about" means that the expressed quantities or ranges need not be exact but may be approximated and/or larger or smaller, reflecting acceptable tolerances, conversion factors, measurement error, etc. Moreover, the slider panel 52 may include a rectangular-shaped body. However, the size and shape of the slider panel 52 is not intended to limit this disclosure.

The slider panel 52 may be a polymer-based component. For example, slider panel 52 could be constructed out of a sheet moulding compound (e.g., glass-fiber reinforced polyester), polypropylene, polyamide, etc.

Each clip 54 may be a metallic-based component. For example, the clip 54 could be constructed out of aluminum, stainless steel, etc. In other embodiments, the clip 54 could also be a polymer-based component.

Each clip 54 may be generally U-shaped and may include a first leg 62, a second leg 64, and a curved bridge 66 that connects the first leg 62 to the second leg 64. Together, the first leg 62, the second leg 64, and the curved bridge 66 may establish a unitary, single-piece structure of the clip 54. The first leg 62 may include a hooked portion 68 disposed at an opposite end from the curved bridge 66, and the second leg 64 may include a retention flange 70 and a tab 72 that protrudes from the retention flange 70.

Figure 7:
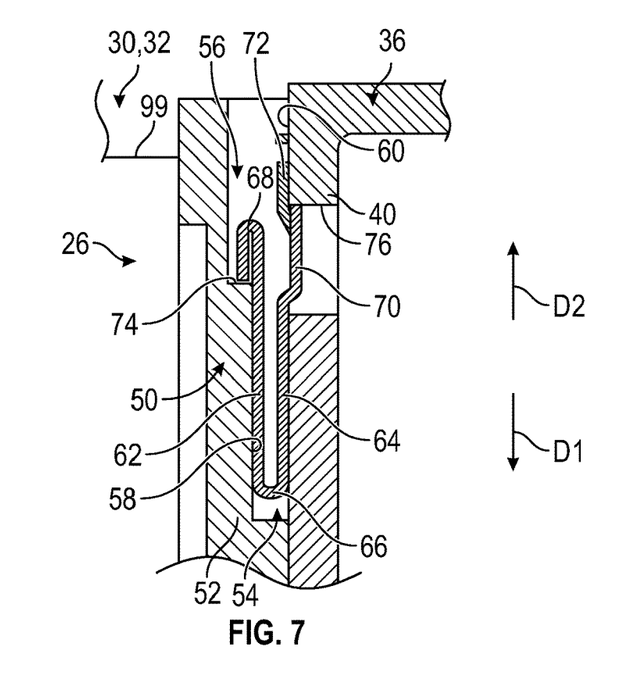
FIG. 7 is a cross-sectional view through section 7-7 of FIG. 4.
Figure 8:
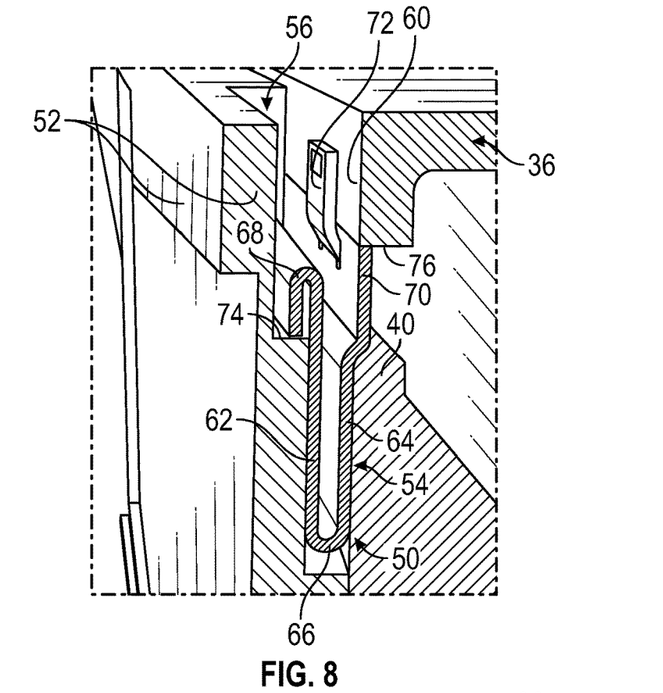
FIG. 8 illustrates an interface between a retention assembly of a cell-to-pack battery system and an enclosure tray.

Referring now primarily to FIGS. 7 and 8, the retention assembly 50 may facilitate insertion of the cell stack 30/cell matrix 32 into the enclosure tray 36 along a direction D1. The direction D1 may extend in parallel with a Z-axis of the traction battery pack 18, and thus the retention assembly 50 may facilitate insertion of the cell stack 30 toward the floor 38 of the enclosure tray 36. Once received within the enclosure tray 36, the slider panel 52 of the retention assembly 50 is positioned axially between the cell stack 30/cell matrix 32 and the side wall 40 of the enclosure tray 36. The slider panel 52 may extend to a height that is slightly proud of an upper surface 99 of the cell stack 30/cell matrix 32.

The retention assembly 50 may be further configured to provide a "hold down" design for retaining the cell stack 30/cell matrix 32 relative to the enclosure tray 36. For example, the clip 54 of the retention assembly 50 may prevent displacement of the cell stack 30/cell matrix 32 in second direction D2 that is opposite the direction D1 of insertion. In this regard, the first leg 62 of the clip 54 may interface with the slider panel 52, and the second leg 64 of the clip 54 may interface with the side wall 40 of the enclosure tray 36. The hooked portion 68 of the first leg 62 may engage a lip 74 provided within the pocket 56 of the outer face 58 of the slider panel 52 for retaining the clip 54 within the pocket 56. Moreover, the retention flange 70 of the second leg 64 may engage a lip 76 of the side wall 40 for substantially preventing the cell stack 30 from backing out (e.g., moving in the direction D2) of the enclosure tray 36. In the fully inserted and retained position, the clip 54 may be positioned at a lower height than the upper surface 99 of the cell stack 30/cell matrix 32.

The tab 72 may engage the interior surface 60 of the side wall 40. The tab 72 allows for releasing the retention assembly 50 from the side wall 40 subsequent to assembly. For example, a tool may be inserted between the tab 72 and the interior surface 60 to allow the retention flange 70 to slide past the lip 74.

Figure 9:
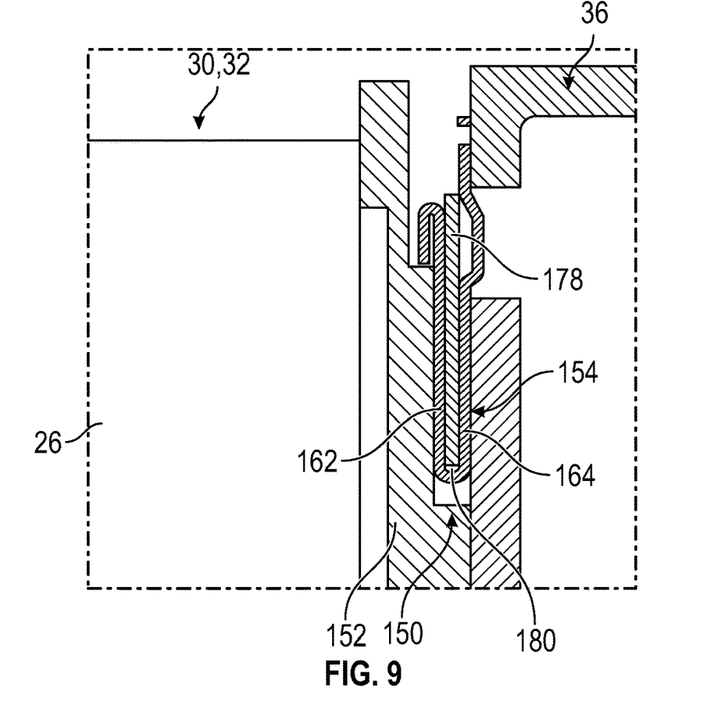
FIG. 9 illustrates another exemplary retention assembly of a cell-to-pack battery system.

FIG. 9 illustrates another exemplary retention assembly 150 for retaining a cell stack 30/cell matrix 32 relative to the enclosure tray 36. In this embodiment, the retention assembly 150 includes a slider panel 152, a clip 154, and a shim 178. The shim 178 may be positioned within a slot 180 extending between a first leg 162 and a second leg 164 of the clip 154. The shim 178 may be provided for augmenting (e.g., increasing) the compressive force applied to the cell stack 30/cell matrix 32. The thickness of the shim 178 may be varied for providing a desired amount of compressive force.

Figures 10, 11:
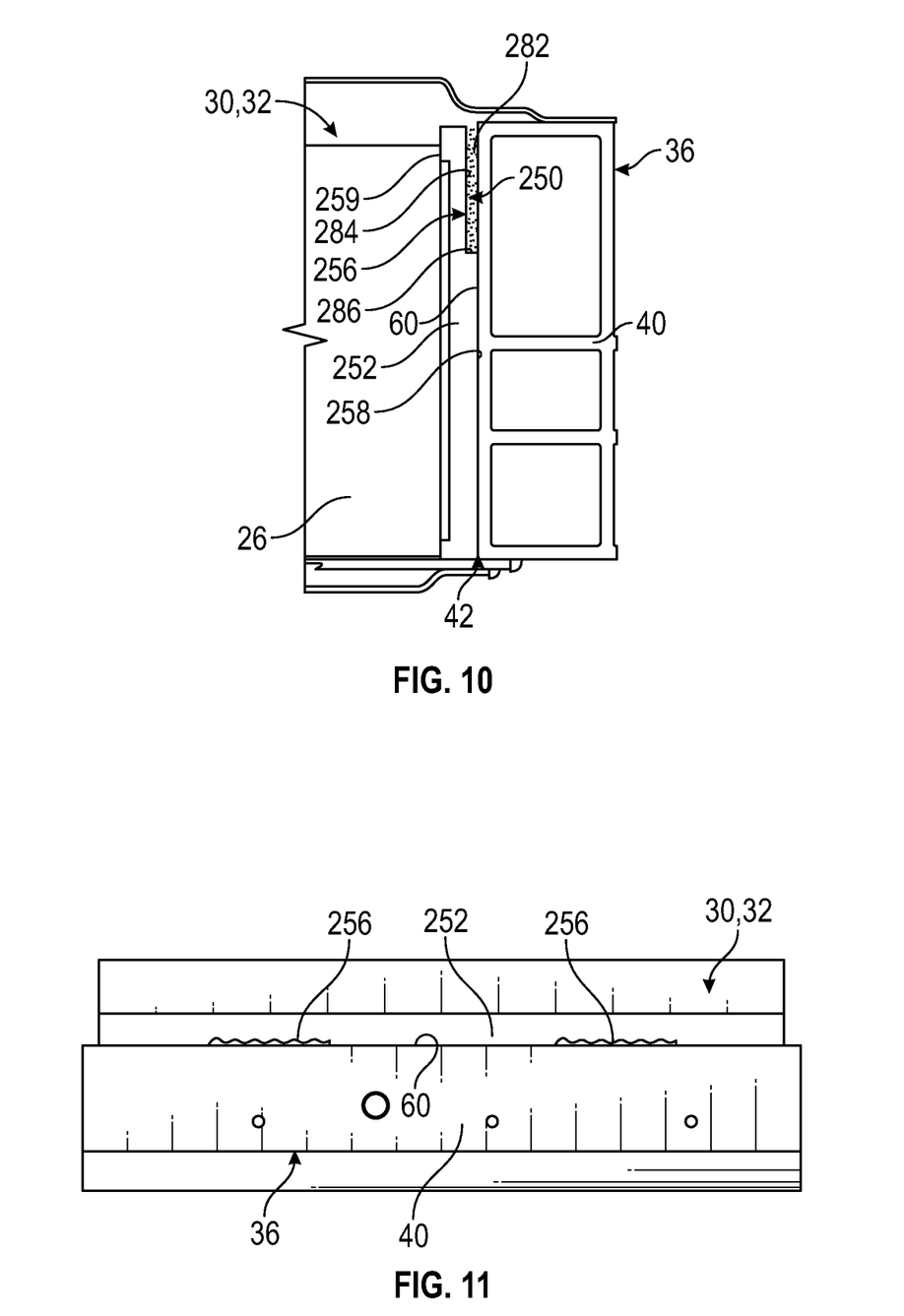
FIG. 10 illustrates yet another exemplary retention assembly of a cell-to-pack battery system.
FIG. 11 illustrates an adhesive fill area established by the retention assembly of FIG. 10.
Figure 12:
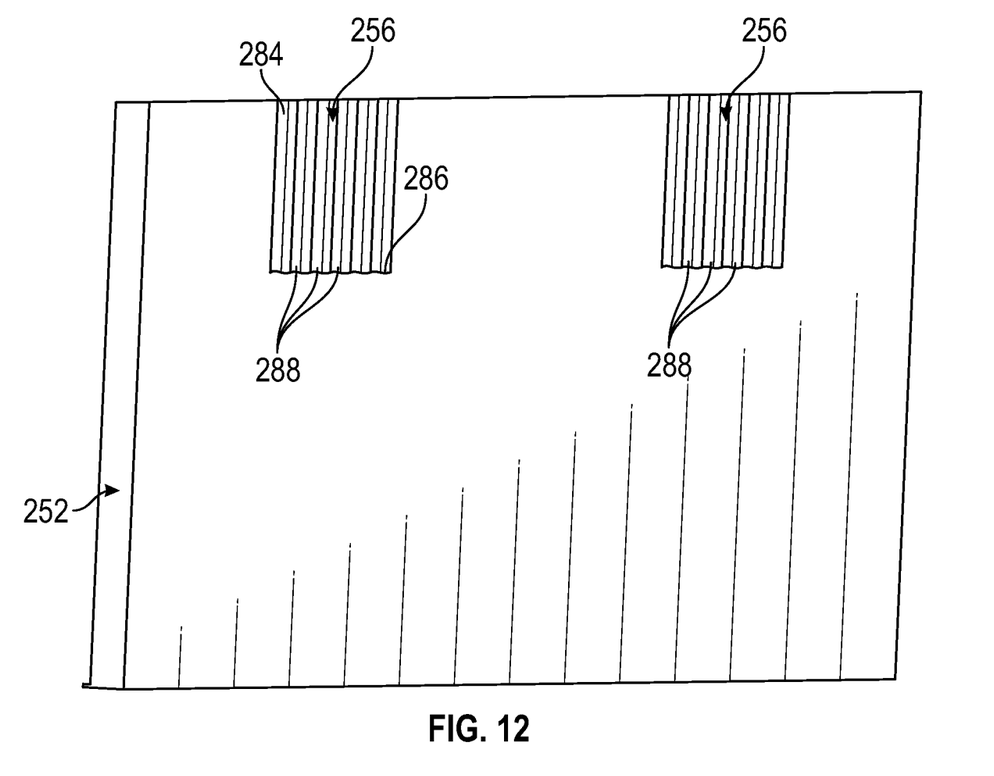
FIG. 12 illustrates an exemplary slider panel of the retention assembly of FIG. 10.

FIGS. 10, 11, and 12 illustrate yet another exemplary retention assembly 250 for retaining a cell stack 30/cell matrix 32 relative to the enclosure tray 36. In this embodiment, the retention assembly 250 includes a slider panel 252 and a structural adhesive 282. When received within the cell-compressing opening 42, an outer face 258 of the slider panel 252 faces toward and interfaces with an interior surface 60 of one of the side walls 40 of the enclosure tray 36, and an opposing outer face 259 of the slider panel 252 may interface with one of the battery cells 26 of the cell stack 30/cell matrix 32.

The slider panel 252 may include one or more pockets 256. Each pocket 256 may establish a fill area for receiving the structural adhesive 282. The pockets 256 may include a side wall 284 and a floor 286. Ribbed surfaces 288 (best shown in FIG. 12) may be provide on the side wall 284 and/or the floor 286. The ribbed surfaces 288 may be configured to increase an amount of surface area available for receiving and binding with the structural adhesive 282.

The side wall 284 and floor 286 of the pocket 256 of the slider panel 252, and the interior surface 60 of the side wall 40 of the enclosure tray 36 may establish a containment perimeter about the structural adhesive 282 for confining the adhesive to desired locations of the traction battery pack 18. Once cured, the structural adhesive 282 can retain the cell stack 30/cell matrix 32 in place and add stiffness to the cell-to-pack battery system 20. The structural adhesive 282 may be an epoxy or any other suitable adhesive.

The exemplary retention assemblies of this disclosure provide an interface for retaining cell stacks of a cell-to-pack battery system of a traction battery pack. The retention assemblies provide solutions to various assembly complexities that can arise as a result of eliminating much of the array support structures and tray rigid cross members associated with convention traction battery packs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
an enclosure assembly including an enclosure tray;
a cell-to-pack battery system housed within the enclosure assembly and including a cell stack and a retention assembly; and
the retention assembly including a slider panel that establishes an interface between the cell stack and a side wall of the enclosure tray,
wherein the retention assembly further includes a clip received within a pocket of the slider panel.

2. The traction battery pack as recited in claim 1, wherein the slider panel is secured to a battery cell that is located at a longitudinal extent of the cell stack.

3. The traction battery pack as recited in claim 1, wherein the cell stack establishes a cell row of a cell matrix of the cell-to-pack battery system.

4. The traction battery pack as recited in claim 3, wherein the enclosure tray provides a cell-compressing opening for compressing the cell matrix.

5. The traction battery pack as recited in claim 1, wherein the clip includes a first leg that interfaces with the slider panel and a second leg that interfaces with the side wall of the enclosure tray.

6. The traction battery pack as recited in claim 5, wherein the first leg includes a hooked portion that engages a lip provided within the pocket of the slider panel.

7. The traction battery pack as recited in claim 5, wherein the second leg includes a retention flange that engages a lip of the side wall and a tab that engages an interior surface of the side wall.

8. The traction battery pack as recited in claim 1, wherein the retention assembly further includes a shim received within a slot of the clip.

9. A traction battery pack, comprising:
an enclosure assembly including an enclosure tray;
a cell-to-pack battery system housed within the enclosure assembly and including a cell stack and a retention assembly; and
the retention assembly including a slider panel that establishes an interface between the cell stack and a side wall of the enclosure tray,
wherein the retention assembly further includes a structural adhesive received within a pocket of the slider panel.

10. The traction battery pack as recited in claim 9, wherein a side wall of the pocket, a floor of the pocket, and an interior surface of the side wall of the enclosure tray establish a containment perimeter about the structural adhesive.

11. The traction battery pack as recited in claim 10, wherein at least one of the side wall or the floor includes a ribbed surface.

12. A traction battery pack, comprising:
an enclosure assembly including an enclosure cover and an enclosure tray;
a cell-to-pack battery system housed within the enclosure assembly and including a cell matrix and a retention assembly; and
the retention assembly including a slider panel that establishes an interface between the cell matrix and a side wall of the enclosure tray,
wherein the retention assembly further includes a clip or a structural adhesive received within a pocket of the slider panel.

13. The traction battery pack as recited in claim 12, wherein the cell matrix includes a plurality of cell stacks.

14. The traction battery pack as recited in claim 12, wherein the clip includes a first leg that interfaces with the slider panel and a second leg that interfaces with the side wall of the enclosure tray.

15. The traction battery pack as recited in claim 14, wherein the first leg includes a hooked portion that engages a lip provided within the pocket of the slider panel, and further wherein the second leg includes a retention flange that engages a lip of the side wall and a tab that engages an interior surface of the side wall.

16. The traction battery pack as recited in claim 12, wherein the retention assembly includes the clip received within the pocket of the slider panel and a shim received within a slot of the clip.

17. The traction battery pack as recited in claim 12, wherein the pocket includes a ribbed surface.

* * * * *